United States Patent [19]

Schwarzschild

[11] Patent Number: 4,475,610

[45] Date of Patent: Oct. 9, 1984

[54] LEVERED SCALE WITH STRAIN GAUGE TENSION LINK

[75] Inventor: Jack Schwarzschild, Stamford, Conn.

[73] Assignee: Timex Mecial Products Corporation, Waterbury, Conn.

[21] Appl. No.: 478,402

[22] Filed: Mar. 24, 1983

[51] Int. Cl.³ .................. G01G 3/14; G01G 21/12; G01G 21/23

[52] U.S. Cl. ........................... 177/211; 177/255; 177/DIG. 9; 73/862.65

[58] Field of Search .............. 177/211, DIG. 9, 134, 177/255; 73/862.65, 862.66; 403/145, 146, 149, 397

[56] References Cited

U.S. PATENT DOCUMENTS

| | | | |
|---|---|---|---|
| 971,758 | 10/1910 | Jones | 177/134 |
| 3,258,078 | 6/1966 | Crone et al. | 177/211 |
| 3,472,541 | 10/1969 | Hulten | 403/146 |
| 3,591,216 | 7/1971 | Onufer | 403/146 |
| 4,280,576 | 7/1981 | Smith, Jr. | 177/DIG. 9 X |

*Primary Examiner*—E. A. Goldberg
*Assistant Examiner*—Patrick W. Foster
*Attorney, Agent, or Firm*—William C. Crutcher; Joseph A. Biela

[57] ABSTRACT

A levered scale for weighing human beings is disclosed in which weight measurement is produced by direct tensile loading of at least one stress-dependent transducer that is bonded to the central member of an improved tension link plate which is pivotally supported at one end by a U-shaped bracket and pivotally coupled at the opposite end to lever arms. The thin tension link plate, which is made of elastically deformable sheet metal, is received between the sides of the U-shaped bracket. The tension link plate is connected directly to the U-shaped bracket by a first cross pin and to the lever arms by a second cross pin. The resultant force produced by the weight of the load applied to the scale produces vertically downward movement of the lever arms thereby providing tensile loading of the tension link plate and the stress-dependent transducers bonded or deposited thereto. The end of the tension link plate supported by the U-shaped bracket is held in position while the tensile loading is applied directly to the opposite end of the tension link plate. The resultant force which is proportional to the weight of the load applied to the scale is transmitted as tensile force directly to the tension link plate thereby producing changes in transducer resistance proportional to the resultant force.

11 Claims, 5 Drawing Figures

LEVERED SCALE WITH STRAIN GAUGE TENSION LINK

BACKGROUND OF THE INVENTION

The present invention relates to a scale, especially of the type for weighing human beings, having a tension link plate with at least one stress-dependent resistor bonded thereto for generating an electrical signal that is proportional to the weight of the load applied to the scale.

It is well known in the art to have weighing platforms operatively connected with one or more stress-dependent transducers that serve as weight measuring elements. The stress-dependent transducers or strain gauges are made of electrically conductive wire, etched metal foil, or semiconductor material mounted on deformable strip-like carriers which become elongated as a load is applied to the platform. As the strain gauge carrier elongates, the electrical resistance of the conductive wire, etched metal foil, or semiconductor material changes. Specifically, the electrical resistance increases in proportion to strain produced by stresses imposed on the device. This resistance can be detected by means of a suitable circuit and calibrated in weight units.

In addition to the strain gauge transducers, mechanical guide elements are provided to allow the weighing platform to be vertically displaced. For example, U.S. Pat. No. 3,797,593 issued to Conley shows a plurality of mechanical guide elements each including a tension link captively retained on a cross pin and connected to transducers by attachment to the legs of a clevis by a pin. The base of each of the load transducers is further mounted to mechanical guide elements which are tension coupled to the weighing platform.

A large number of cross pins are used with the mechanical guide elements to provide for connection of all the mechanical guide elements in series to permit the tension produced by the load to be transmitted to the transducer. A first cross pin is supported by upright members of a mechanical guide for the transmission of loads to ground. This first cross pin also supports a means for applying a pure tension load on the transducer and to eliminate any other loads on the transducer. A similar means applies tension to the bottom of the transducer and is coupled to a second cross pin. The second cross pin, in turn, is load coupled to a pair of arms which suspend from a platform. U.S. Pat. No. 4,211,296 issued to Lotscher discloses a scale having an electrical conductor which is displaced in similar fashion to strain gauge conductors and which is deformably placed in tension by holders attached to the wire and to the platform when a load is applied to the platform. U.S. Pat. No. 3,831,687 issued to Maffia et al. discloses a weighing scale wherein a strain gauge load cell is supported in such a manner that a tensile force is applied to it by a support cable.

The prior art scales generally show resistance strain gauges used with mechanical guide elements requiring multiple connections to transfer lever arms, to load links, to bell cranks that allow the application of turning moments correlative with the weight of the load, to clevis and pins and to independently held electrically elongatable wire in order to produce weight measurements of the applied load.

It is therefore an object of this invention to provide an improved tension link having one point of connection directly to a mechanical guide element and another point of connection directly to transfer lever arms.

Another object of the invention is to provide an inexpensive, elastically deformable, thin sheet metal tension link for supporting at least one resistance strain gauge transducer.

A further object of the invention is to provide a single tension link between the applied resultant force and ground so that the resultant force will be directly transmitted to the strain gauge transducers to provide greater accuracy.

SUMMARY OF THE INVENTION

A scale is disclosed which has a mounting means for supporting one end of a load link and lever arms for supporting a weighing platform wherein the lever arms are mechanically linked together to provide a tensile resultant force acting on the opposite end of the load link due to the weight of the mass applied to the platform. The load link, at one end, is attached to a first cross pin which is pivotally connected to the mounting means and, at the opposite end, to a second cross pin which is pivotally coupled to the lever arms. The load link includes a tension link plate which has a top tab member, a central member, and a bottom tab member. The top tab member has a first hole for receiving the first cross pin and the bottom tab member has a second hole for receiving the second cross pin and the central member has stress-dependent material bonded thereto. The stress-dependent material is adapted to provide electrical signals in response to changes in its electrical resistance proportional to the magnitude of the resultant tensile force acting on the tension link plate. Electrically conductive wires are connected to the stress-dependent material for transmitting electrical signals to be processed by electronic circuitry in order to display the weight of the mass which is applied to the weighing platform.

DESCRIPTION OF THE PREFERRED EMBODIMENT

Figure 1:
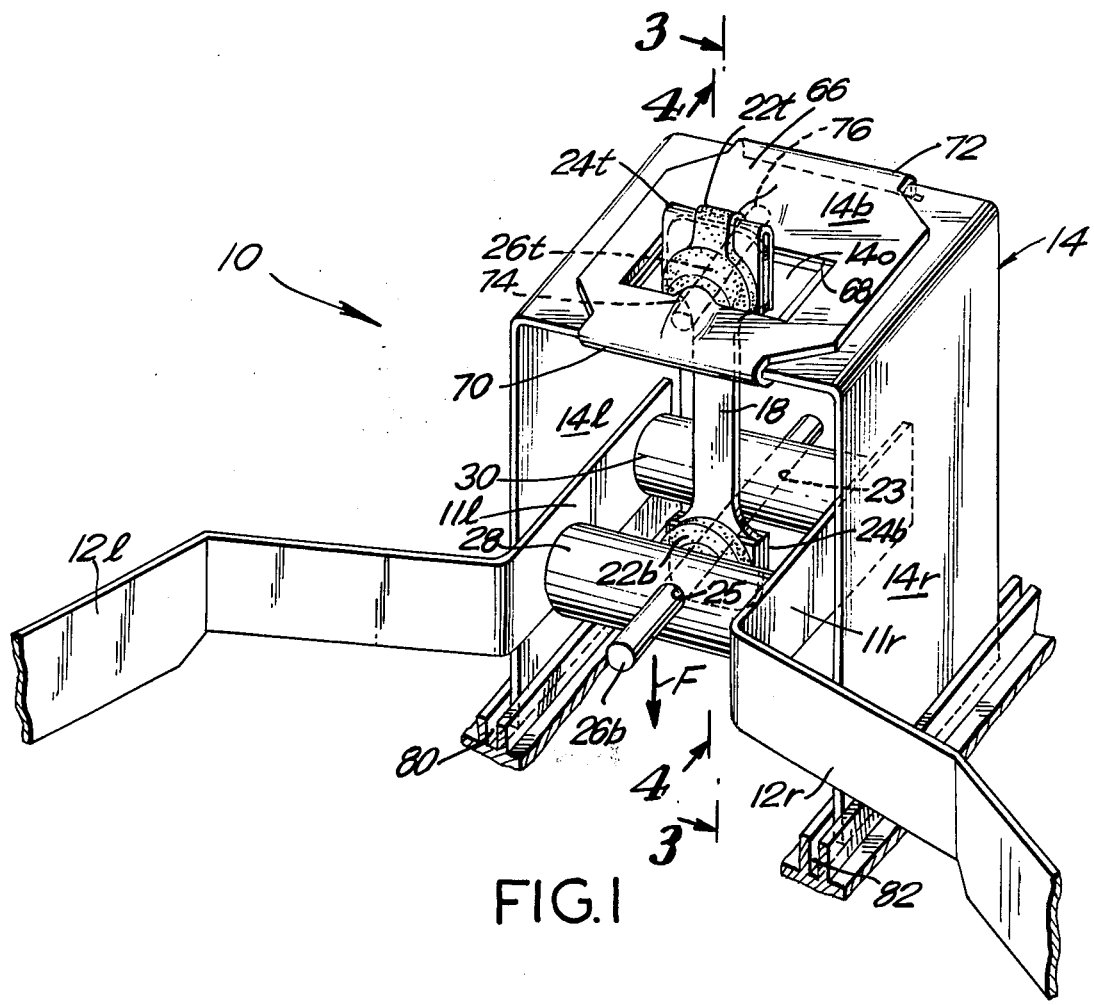
FIG. 1 is a perspective view of the scale mount of the levered scale in accordance with the present invention.
Figure 3:
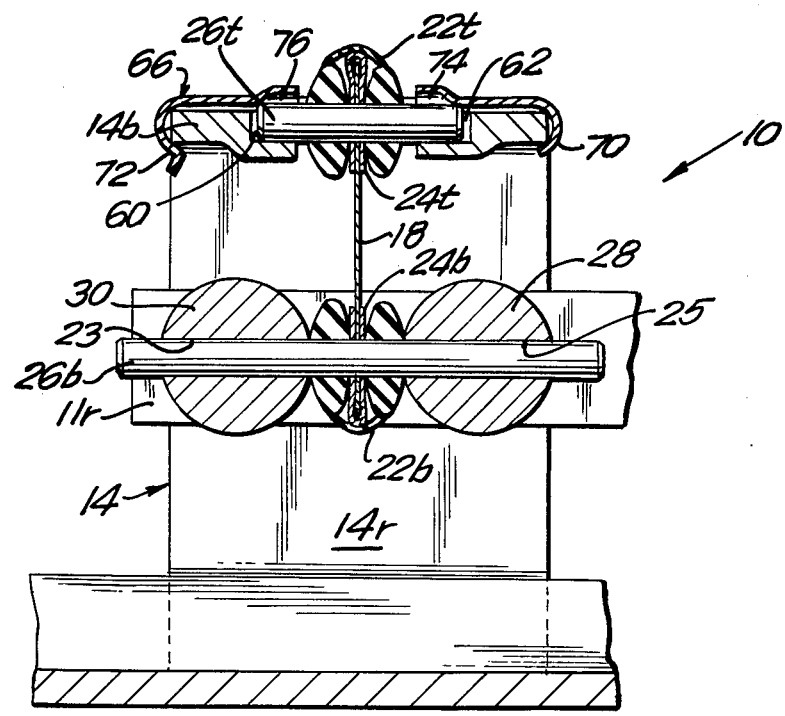
FIG. 3 is a partial section taken along 3—3 of FIG. 1.
Figure 4:
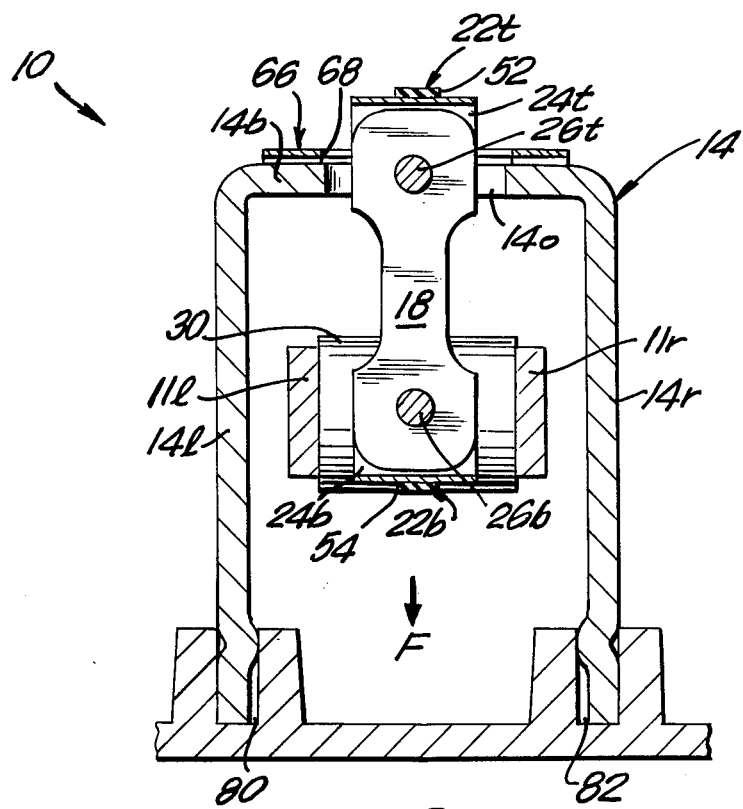
FIG. 4 is a partial section taken along 4—4 of FIG. 1.

FIGS. 1, 3 and 4 show different views of scale mount 10. In general, the scale (not shown) has a weighing platform which is supported at predetermined points by mechanically linked transfer lever arms substantially in a manner known in the art. Portions of two lever arms, left lever arm portion 12l and right lever arm portion 12r, are shown coupled to scale mount 10 in FIG. 1. The mass (load) to be weighed is applied to the weighing platform. Forces, due to the weight of the mass, act downward on the lever arms at predetermined points of support and are effectively summed at scale mount 10 to produce a resultant force F acting on tension link plate 18 and having a direction as shown in FIG. 1. The scale mount, in response to the resultant force, is capabale of producing an electrical signal, as described below, which is proportional to the resultant force. The resultant force is substantially proportional to the weight of the mass applied to the weighing platform. The ratio of the force, i.e. the weight of the mass on the platform, to the resultant force at the scale mount is approximately 7.5. For example, if a 300 pound weight is applied to the platform, the proportional resultant force acting on the tension link plate would be 40 pounds. The electrical signal is processed by electronic circuitry (not shown) which provides for the display of the weight of the mass.

Scale mount 10 includes inverted U-shaped bracket 14 having left side 14l, right side 14r and base 14b. Base 14b has rectangular opening 14o substantially centrally located therein. Scale mount 10 further includes load link 16 which is shown more clearly in FIG. 2. Load link 16 includes thin, tension link plate 18 which has front and back surfaces 18f and 18b. Attached or bonded to or deposited on front surface 18f of link plate 18 is front stress-dependent resistor 20f and attached or bonded to or deposited on back surface 18b of link plate 18 is back stress-dependent resistor 20b. The stress-dependent resistors are preferably made of etched metal foil. Load link 16 further includes top resilient padding 22t, bottom resilient padding 22b, top metal member 24t and bottom metal member 24b.

The ends of left and right lever arm portions, 12l and 12r, are received between, but spaced apart from, left side 14l and right side 14r of bracket 14 to provide substantially parallel, spaced apart left and right lever arm ends, 11l and 11r, for load coupling the lever arms to bracket 14 through load link 16. The lever arm ends are rigidly secured to opposite ends of first and second support members, 28 and 30. The support members provide a means for rigidly connecting the ends of the lever arms together, for maintaining the lever arms ends in parallel, spaced-apart relationship with one another and for coupling the lever arms to the scale mount as described below. First support member 28 has first orifice 25 and second support member 30 has second orifice 23.

Load link 16 is supported at one end by top cross pin 26t which is pivotably received by a portion of the base of bracket 14 and at the opposite end by bottom cross pin 26b which is pivotably received by the support members. In this embodiment, the opposite end of the load link is retained between first and second support members, 28 and 30. Top cross pin 26t is approximately 11 mm long and has a diameter of approximately 1.5 mm. Bottom cross pin 26b is approximately 20 mm long and has a diameter of approximately 1.5 mm. Both cross pins are made of hardened tool steel CRES-AISI 440.

Base 14b of U-shaped bracket 14 has first and second recesses, 60 and 62, in parallel relation to left and right sides, 14l and 14r, of bracket 14 and aligned with respect to each other on opposite sides of rectangular opening 14o. The recesses are on the side of the base of the bracket distal to the left and right sides of bracket 14 and are in direct communication with opening 14o. Recesses 60 and 62 receive the end portions of top cross pin 26t as will be explained below.

Figure 2:
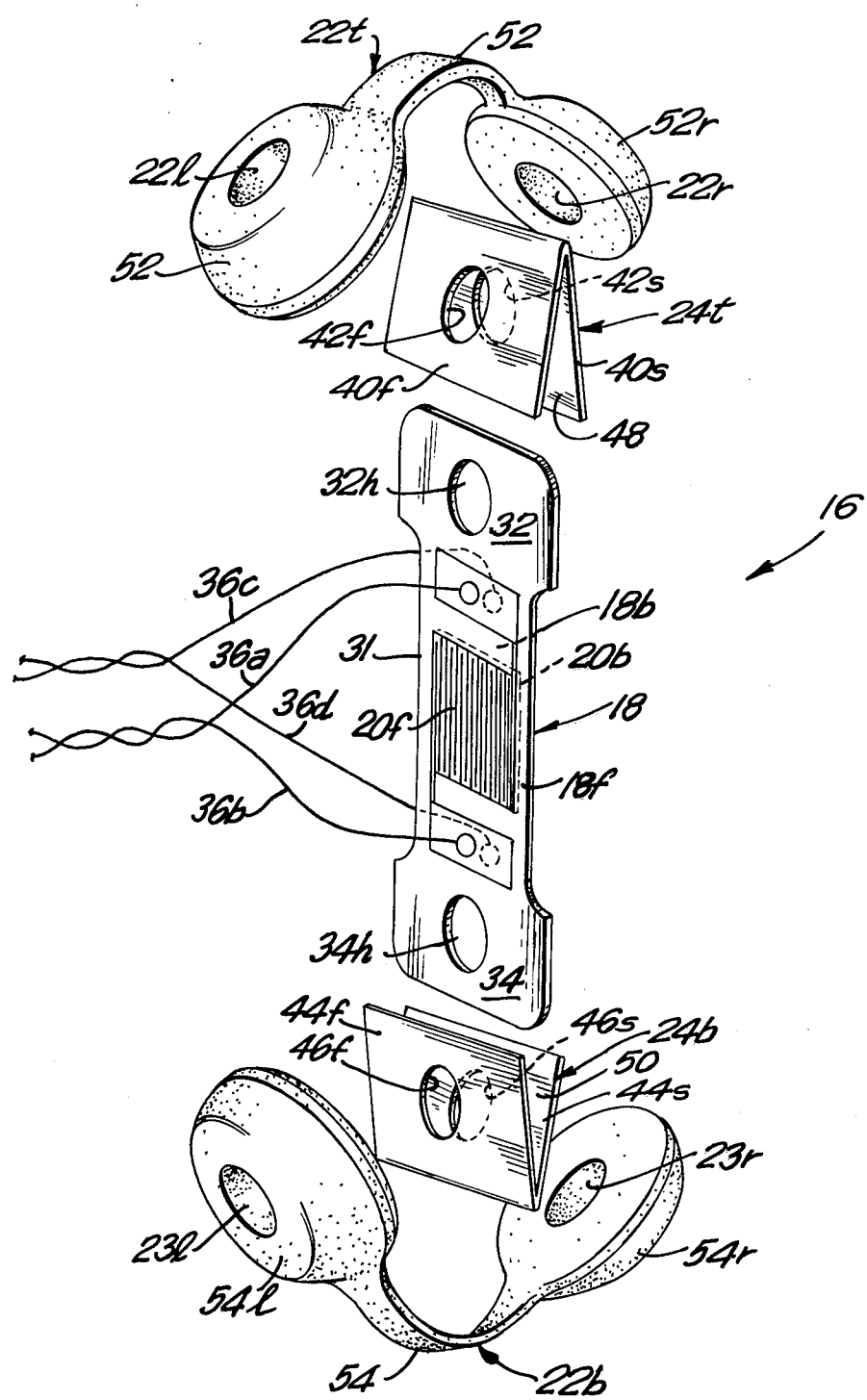
FIG. 2 is a perspective view of the load link of the scale mount as shown in FIG. 1.

FIG. 2 shows the individual components of the load link which, when assembled, form a portion of scale mount 10 as shown in FIG. 1. The structure of tension link plate 18 of load link 16 is clearly shown in FIG. 2. The tension link plate is made of thin (approximately 0.005 inches) sheet metal and is formed substantially in the shape of an "I". The I-shaped tension link plate may be viewed as having three members: a central member 31 and two substantially identically shaped end members hereinafter identified as top tab 32 and bottom tab 34. The tabs are symbolically represented by the horizontal lines in "I" and the central member is symbolically represented by the vertical line in "I". Top tab 32 has first hole 32h substantially centrally located therein and bottom tab 34 has second hole 34h substantially centrally located therein. Central member 30 has bonded thereto on front surface 18f front stress-dependent resistor 20f which is a strain gauge transducer made of etched metal foil. Central member 31 has bonded thereto on back surface 18b back stress-dependent resistor 20b which is also a strain gauge transducer made of etched metal foil material.

Figure 5:
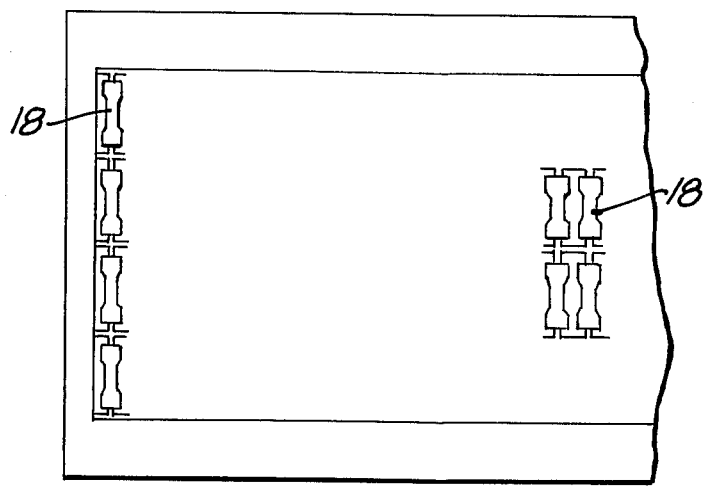
FIG. 5 is a plan view of sheet metal with tension link plates integrally connected thereto.

The tension link plates with stress-dependent resistors etched thereon are made generally as follows:

(1) Sheet metal made of high strength alloy steel is etched forming a plurality of tension link plates integrally connected, at their tabs, to portions of the sheet metal which acts as a frame for providing support for the tension link plates as shown in FIG. 5.

(2) Resin adhesive (epoxy) is applied to both sides of the tension link plates for bonding the strain gauge material thereto.

(3) Nickel-chromium alloy foil is laminated on both sides of the tension link plates. The nickel-chromium foil is applied to each tension link plate to a thickness of approximately 0.5 mils.

(4) The foil is etched to form the winding, convoluted strain gauge configuration (grid) on each surface of the central region of each tension link plate as shown in FIG. 2. The strain gauge has a resistance of approximately 350 ohms.

(5) Each tension link plate 18 is "punched out" or separated from the sheet metal frame and can be implemented as part of load link 16 as described herein.

Advantages of making tension link plates in this manner include the fact that each plate is inexpensive, a large number of plates can be processed at one time, and each plate is thin and has a small surface area. The thickness of each plate is a function of the resultant force to be applied in tension thereto. The ultimate tensile strength of each tension link plate is 227,000 psi and the grain axis of each plate is parallel to the length of the plate. Each tension link plate is approximately 0.6 inches long and approximately 0.2 inches wide at its widest point. Central member 31 of each tension link is approximately 0.1 inches wide. The thickness of each tension link plate is uniform throughout and is a function of the resultant magnitude of the force applied thereto.

The strain gauges on the tension link plates may also be made by applying a thin coating of semiconductor material to a sheet metal substrate, which has been previously coated with an insulating layer, and be etching the semiconductor material to form thin semiconductor grids on each surface of the central region of each tension link plate.

External electrical terminal leads 36a, 36b, 36c and 36d are electrically connected to each of the strain gauges in a manner known in the art. An acrylic coating is applied to both sides of the tension link plate once the leads are electrically connected thereto. In this embodiment, leads 36c and 36d are electrically connected to strain gauge 20b and leads 36a and 36b are electrically connected to strain gauge 20f. The electrical terminal leads are 34 gauge heat stripable polyurethane coated solid copper wires each approximately 9 inches in length.

The structure of top and bottom metal members, 24t and 24b, is shown clearly in FIG. 2. Top metal member 24t is a substantially rectangular shaped piece of sheet metal (stainless steel) that is folded along a line that is parallel to the width of the metal member forming first and second folded portions, 40f and 40s, having substantially equivalent dimensions. The folded portions form a substantially "V" shaped notch 48. First folded portion 40f has first opening 42f therethrough and second folded portion 40s has second opening 42s therethrough. The width (approximately 0.2 inches) of the top metal member is approximately the same as the width of top tab 32 of tension link plate 18. The length (approximately 0.4 inches) of top metal member 24t is slightly larger than twice the length of top tab 32. The description of the structure of the top metal member is fully applicable to the structure of bottom metal member 24b. Bottom metal member 24b has third and fourth folded portions 44f and 44s with substantially equivalent dimensions. The folded portions form substantially "V" shaped notch 50. Third folded portion 44f has third opening 46f therethrough and fourth folded portion 44s has fourth opening 46s therethrough. Each of the openings in each of the metal members are substantially centrally positioned in each of the folded portions. Top tab 32 is received between first and second folded portions, 40f and 40s, into V-shaped notch 48. Bottom tab 34 is received between third and fourth folded portions, 44f and 44s, into V-shaped notch 50.

The dimensions of the metal members are critical for the following reasons: the metal members cannot come in contact with the strain gauge material on the tension link plate, the openings in each of the folded portions of metal member 24t must be in alignment with each other and with first hole 32h in the top tab of tension link plate 18 and the openings in each of the folded portions of metal member 24b must be in alignment with each other and with second hole 34h in the bottom tab of tension link plate 18. The folded portions of each metal member 24t and 24b, are pressed toward each other to close about top tab 32 and bottom tab 34, respectively, of tension link plate 18 for the important purpose of providing rigidity and stability to the tension link plate when the plate is placed in tension due to the resultant force, F, applied thereto. Without implementing metal members 24t and 24b, or equivalent structures, the tabs would begin to fold under tension and subsequently tear from the cross pins.

The structure of top and bottom resilient padding (webbed "O-rings"), 22t and 22b, is clearly shown in FIG. 2. Top resilient padding 22t is substantially in the shape of "ear muffs" with first bendable member 52 linking first donut-shaped member 52l and second donut-shaped member 52r. Each resilient padding may be made of flexible plastic or rubber material for reasons that will be explained below. First donut-shaped member 52l has first aperture 22l therethrough and second donut-shaped member 52r has second aperture 22r therethrough. The description of the structure of top resilient padding 22t is fully applicable to the structure of bottom resilient padding 22b. Bottom resilient padding 22b has second bendable member 54 linking third donut-shaped member 54l and fourth donut-shaped member 54r. Third donut-shaped member 54l has third aperture 23l therethrough and fourth donut-shaped member 54r has fourth aperture 23r therethrough. Top resilient padding 22t is placed over the top metal member 24t substantially in the manner of placing ear muffs over the ears. First bendable member 52 is made to arch over the bend formed by folding the top metal member into first and second folded portions as shown in FIGS. 1 and 2. Bottom resilient padding 22b is placed over the bottom metal member 24b substantially in the manner of placing ear muffs over the ears. Second bendable member 54 is made to arch over the bend formed by folding the bottom metal member into third and fourth folded portions. The dimensions of the resilient padding are critical only that in each aperture in donut-shaped members 52l and 52r must be in alignment with each other and with first hole 32h in the top tab of tension link plate 18 and each aperture in donut-shaped members 54l and 54r must be in alignment with each other and with second hole 34h in the bottom tab of tension link plate 18. The diameter of each donut-shaped member is approximately 4.5 mm, the width and thickness of each bendable member is approximately 2.3 mm and 0.4 mm, respectively, and the distance between the centers of each pair of apertures is approximately 8 mm. First, second, third, and fourth donut-shaped members may be referred to as first, second, third, and fourth padding members.

It would be obvious to those skilled in the art to implement two independent, resilient "O-rings" in place of the resilient padding described above. The function of each donut-shaped member could be performed by separate (non-webbed) O-rings not linked together by a bendable member as described above for each resilient padding.

The individual components of load link 16 are positioned with respect to one another as described above so that first and second apertures, 22l and 22r, are in alignment with first and second openings, 42f and 42s, and the first and second apertures and openings are all in alignmnet with first hole 32h in order to receive top cross pin 26t. Once top cross pin is in position in load link 16, the load link is received by rectangular opening 14o in base 14b of bracket 14 whereby at least a portion of the ends of the top cross pin are received by first and second recesses 60 and 62 in the base of bracket 14 as shown in FIG. 3. The top cross pin is pivotally secured to the recesses of base 14b by cross pin clip means 66.

Cross pin clip means includes an opening 68 at least as large as rectangular opening 14o for alignment therewith and third and fourth recesses, 74 and 76, for receiving a portion of the ends of the top cross pin once the clip means is placed in contact with base 14b. Cross pin clip means further includes first and second edges 70 and 72 which extend slightly beyond the base of bracket 14 and which are crimped to engage the base of the bracket for attaching the clip means to the bracket for the purpose of securing the top cross pin and, therefore, the load link to bracket 14.

Third and fourth apertures, 23l and 23r, are in alignment with second and third openings, 46f and 46s. The third and fourth apertures and openings are all in alignment with second hole 34h which must be in alignment with first and second orifices, 25 and 23, of first and second support members 28 and 30, in order to collectively receive therethrough bottom cross pin 26b. The bottom cross pin, when received by first and second orifices, 25 and 23, is incapable of any translatory motion because the bottom cross pin is bound at its ends by an attachment means such as a hangar link (not shown). Axial movement by bottom cross pin 26b along the axial directions of orifices 25 and 23 is thereby substantially prevented. In the above-described manner, load link 16 is captively retained on both top cross pin 26t and bottom cross pin 26b and is pivotally connected to left and right lever arm portions 12l and 12r, via first and second support members 28 and 30, and to base 14b of bracket 14.

Bracket 14 is removably secured to the base of the scale (not shown). The base of the scale has fifth and sixth recesses, 80 and 82, aligned with left and right sides, 14l and 14r, for snugly receiving a portion of each side to provide a stable means of support for bracket 14.

The tension link plate is a deformable carrier for strain gauge transducers 20f and 20b. The transducers are made of etched metal foil, electrically conductive wire, or semiconductor material that form a single layer winding or that extends in a convoluted configuration as is known in the art. Only one tension link plate is employed in this embodiment.

The top and bottom metal members provide stiffness to and stability and support for the tension link plate, as described above, during the application of the weight to the scale. The top and bottom metal members may be collectively referred to as support means or individually referred to as top and bottom support means.

The top and bottom resilient padding, which may be webbed or non-webbed "O" rings, substantially prohibit lateral movement of the tension link plate along the axial direction of each cross pin. The padding protects the tension link plate from disturbances that may tend to damage it. However, even though effects from most disturbances are substantially eliminated, the scale mount does permit some horizontal motion without affecting the accuracy of the transducers which are always loaded in tension. At least two stress-dependent resistors, one on either side of tension link plate 18, are implemented to substantially eliminate any bending effects which may occur due, primarily, to horizontal disturbances. The top and bottom resilient padding may be collectively referred to as padding means or individually referred to as top and bottom padding means.

The force produced by the mass (load) applied to the scale is transmitted directly via mechanically linked lever arms and applied as a proportional resultant force to I-shaped tension link plate 18 at the point of contact between bottom tab 34 of the tension link plate and bottom cross pin 26b; the bottom cross pin being connected to the left and right lever arms, 12l and 12r, as described above. The strain gauges on one tension link plate are effectively vertically suspended between the tension application means, the lever arms, and ground, the bracket. The strain gauge transducers are directly interposed in mechanical series between one tension application means and ground. Only two cross pins are employed in connecting the tension link plate to the tension application means and to ground.

The I-shaped tension link plate is a carrier of strain gauge transducers 20f and 20b and receives only tensile loading due to the force which is transmitted from the weighing platform to the bottom tab of elastically deformable tension link plate 18 pulling it downward when a load is applied to the platform. The forces produced by the load produce a direct (downward) tensile force (resultant force) on tension link plate 18 producing changes in the electrical resistance of the strain gauge transducers proportional to the magnitude of the resultant force as indicated by the arrow in FIG. 1. When the load is applied, all of the forces exert a resultant downward force (F) on left and right lever arms, 12l and 12r, producing vertically downward movement of the lever arms and thereby providing direct tensile loading of the tension link plate and of the strain gauge transducers bonded thereto. The lever arms are connected directly to the tension link plate by bottom cross pin 26b as explained above.

External electrical terminal leads 36a, 36b, 36c and 36d provide for the transmission of signals representing the change in electrical resistance of the strain gauge transducers. The signals are processed by an electronic circuit which includes a computer for providing for the weight of the load to be displayed, appropriately calibrated, on a display.

What is claimed is:

1. In a scale having a mounting means for supporting one end of a load link and lever arms for supporting a weighing platform wherein the lever arms are mechanically linked together to provide a tensile resultant force acting on the opposite end of the load link due to the weight of the mass applied to the platform, the improvement which comprises:
   (a) a first cross pin pivotally supported in said mounting means,
   (b) a second cross pin parallel to said first cross pin pivotally coupled to said lever arms,
   (c) a sheet metal tension link plate of uniform thickness including a top tab member, a central member and a bottom tab member, said top tab member having a first hole for receiving said first cross pin, said bottom tab member having a second hole for receiving said second cross pin, and said central member having stress-dependent material bonded thereto, said material adapted to provide electrical signals in response to changes in electrical resistance of said stress-dependent material proportional to the magnitude of said resultant tensile force acting on said tension link plate,
   (d) Top support means having a first notch for receiving said top tab member and having first and second openings aligned with each other and with said first hole in said top tab member for receiving said first cross pin for providing stiffness to said top tab member,
   (e) bottom support means having a second notch for receiving said bottom tab member and having third and fourth openings aligned with each other and with said second hole in said bottom tab member for receiving said second cross pin for providing stiffness to said bottom tab member, and
   (f) electrically conductive wires connected to said stress-dependent material for transmitting said electrical signals for processing by electronic circuitry means to provide for the display of the weight of said mass applied to said platform.

2. The scale of claim 1 in which said top support means is a metal member having first and second folded portions formed by folding said metal member, said folded portions forming said first notch and said folded portions having said first and second openings.

3. The scale of claim 1 in which said bottom support means is a metal member having third and fourth folded portions formed by folding said metal member, said folded portions forming said second notch and said folded portions having said third and fourth openings.

4. The scale of claim 7 including a top padding means having first and second padding members, said first and second padding members having first and second apertures aligned with each other, with said first hole in said top tab member and with said first and second openings in said top support means for receiving said first cross pin for substantially prohibiting lateral movement of said tension link plate along the axial direction of said first cross pin.

5. The scale of claim 3 including a bottom padding means having third and fourth padding members, said third and fourth padding members having third and fourth apertures aligned with each other, with said second hole in said bottom tab member and with said third and fourth openings in said bottom support means for receiving said second cross pin for substantially prohibiting lateral movement of said tension link plate along the axial direction of said second cross pin.

6. The scale of claim 1 in which said tension link plate has uniform thickness of approximately 0.005 inches.

7. The scale of claim 6 in which said tension link plate has a length of approximately 0.6 inches.

8. The scale of claim 7 in which said top and bottom tabs of said tension link plate are each approximately 0.2 inches wide and said central member of said tension link plate is approximately 0.1 inches wide.

9. The scale of claim 1 in which said sheet metal is a nickel-chromium alloy.

10. The scale of claim 4 in which said first and second padding members are separate resilient O-rings.

11. The scale of claim 5 in which said third and fourth padding members are separate resilient O-rings.

* * * * *